United States Patent
Hauler et al.

(10) Patent No.: US 9,849,875 B2
(45) Date of Patent: Dec. 26, 2017

(54) METHOD AND DEVICE FOR OPERATING A VEHICLE

(71) Applicant: Robert Bosch GmbH, Stuttgart (DE)

(72) Inventors: Florian Hauler, Linkenheim (DE);
Martin Mueller, Ludwigsburg (DE);
Armin Ruehle, Weinstadt (DE);
Carsten Hasberg, Ilsfeld-Auenstein (DE); Stefan Nordbruch, Kornwestheim (DE); Oliver Pink, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 125 days.

(21) Appl. No.: 14/899,860

(22) PCT Filed: May 15, 2014

(86) PCT No.: PCT/EP2014/059948
§ 371 (c)(1),
(2) Date: Dec. 18, 2015

(87) PCT Pub. No.: WO2014/202290
PCT Pub. Date: Dec. 24, 2014

(65) Prior Publication Data
US 2016/0137198 A1  May 19, 2016

(30) Foreign Application Priority Data
Jun. 20, 2013 (DE) .................. 10 2013 211 607

(51) Int. Cl.
*B60R 22/00* (2006.01)
*E05F 15/00* (2015.01)
(Continued)

(52) U.S. Cl.
CPC ............ *B60W 30/09* (2013.01); *B60W 10/18* (2013.01); *B60W 10/20* (2013.01); *B60W 30/06* (2013.01);
(Continued)

(58) Field of Classification Search
CPC ...... B60W 30/09; B60W 10/18; B60W 10/20; B60W 30/06; B60W 30/08;
(Continued)

(56) References Cited

U.S. PATENT DOCUMENTS

2013/0018549 A1   1/2013   Kobana et al.

FOREIGN PATENT DOCUMENTS

| DE | 10 2012 001312 | * | 8/2012 | ....... B60W 50/082 |
| DE | 10 2011 086 241 | | 5/2013 | |

(Continued)

OTHER PUBLICATIONS

International Search Report for PCT/EP2014/059948, dated Jul. 31, 2014.

*Primary Examiner* — Calvin Cheung
*Assistant Examiner* — Paula L Schneider
(74) *Attorney, Agent, or Firm* — Norton Rose Fulbright US LLP; Gerard Messina

(57) ABSTRACT

A method for operating a vehicle includes: ascertaining a danger measure of a possible stop position for a safe parking of the vehicle; comparing the ascertained danger measure to a predetermined danger measure threshold value; and guiding the vehicle to the possible stop position in order to safely park the vehicle in the possible stop position only if the ascertained danger measure is less than or equal to the predetermined danger measure threshold value.

10 Claims, 1 Drawing Sheet

(51) Int. Cl.
  *G05D 1/00*   (2006.01)
  *G05D 3/00*   (2006.01)
  *G06F 7/00*   (2006.01)
  *G06F 17/00*  (2006.01)
  *B60W 30/09*  (2012.01)
  *B60W 30/08*  (2012.01)
  *B60W 10/18*  (2012.01)
  *B60W 10/20*  (2006.01)
  *B60W 30/06*  (2006.01)
  *B62D 15/02*  (2006.01)
  *B60W 50/14*  (2012.01)

(52) U.S. Cl.
  CPC .......... *B60W 30/08* (2013.01); *B62D 15/0285* (2013.01); *B60W 2050/143* (2013.01); *B60W 2540/26* (2013.01); *B60W 2550/00* (2013.01); *B60W 2720/10* (2013.01)

(58) Field of Classification Search
  CPC ....... B60W 2050/143; B60W 2540/26; B60W 2550/00; B60W 2720/10; B62D 15/0285
  USPC .......................................................... 701/48
  See application file for complete search history.

(56) References Cited

FOREIGN PATENT DOCUMENTS

| | | |
|---|---|---|
| JP | H10207504 A | 8/1998 |
| JP | 2010/125923 | 6/2010 |
| JP | 2011240816 A | 12/2011 |
| WO | 2013008299 A1 | 1/2013 |

\* cited by examiner

METHOD AND DEVICE FOR OPERATING A VEHICLE

BACKGROUND OF THE INVENTION

1. Field of the Invention

The present invention relates to a method, a computer program and a device for operating a vehicle.

2. Description of the Related Art

Driver assistance systems that can securely park a vehicle bring the vehicle to a stop either on the current lane, or alternatively, in the case of multi-lane roadways, as far to the right as possible.

Dangerous situations can arise during this procedure. For example, on a winding country road, the vehicle may be brought to a stop directly at, or after, a location that is poorly visible. On a highway, the vehicle may for example be brought to a stop at a construction site, in a tunnel, on a bridge, or on an acceleration lane.

These situations can result in significant danger to the vehicle itself, and thus also to its occupants, as well as significant danger to other vehicles and their occupants.

BRIEF SUMMARY OF THE INVENTION

The object of the present invention can therefore be regarded as providing a method for operating a vehicle that overcomes the known disadvantages and that reduces or eliminates danger to the vehicle and its occupants, and danger to other traffic participants, after safe parking of the vehicle.

The object of the present invention can also be regarded as providing a corresponding device for operating a motor vehicle.

The object of the present invention can also be regarded as providing a corresponding computer program.

According to an aspect of the present invention, a method for operating a vehicle is provided having the following steps:
  ascertaining a danger measure of a possible stop position for a safe parking of the vehicle,
  comparing the ascertained danger measure to a predetermined danger measure threshold value,
  guiding the vehicle to the possible stop position in order to safely park the vehicle in the possible stop position if the ascertained danger measure is less than or equal to the predetermined danger measure threshold value.

According to a further aspect of the present invention, a device is provided for operating a vehicle, including:
  an ascertaining device for ascertaining a danger measure of a possible stop position for a safe parking of the vehicle,
  a comparator device for comparing the ascertained danger measure to a predetermined danger measure threshold value, and
  a guiding device for guiding the vehicle to the possible stop position in order to safely park the vehicle in the possible stop position if the ascertained danger measure is less than or equal to the predetermined danger measure threshold value.

According to a further aspect of the present invention, a computer program is provided that includes program code for carrying out the method for operating a vehicle when the computer program is executed in a computer.

The present invention thus includes in particular the idea of checking a possible stop position for the safe parking of the vehicle to find out whether, and in particular how safely, the vehicle can be parked in this position, so that the vehicle and its occupants, and/or other vehicles and their occupants, are endangered as little as possible, up to not at all. This is brought about in particular by ascertaining a danger measure for the possible stop position. Such a danger measure describes or characterizes in particular how endangered the vehicle would be in the possible stop position.

"Endangered" is to be understood in particular in relation to possible collisions with other vehicles. That is, in particular, the greater the danger measure, the greater the danger to the vehicle. That is, in particular, the vehicle is then particularly endangered in the possible stop position. Conversely, it is in particular the case that the smaller the danger measure, the less the vehicle is endangered in the possible stop position. The danger measure can in particular describe or characterize an endangerment relating to other traffic participants, for example other vehicles and their occupants.

It is in particular provided that the vehicle is guided to the possible stop position in order to safely park the vehicle in the possible stop position only if the ascertained danger measure is less than or equal to, in particular exclusively less than, a predetermined danger measure threshold value. Thus, the ascertained danger measure is compared to the predetermined danger measure threshold value. In this way, it is advantageously ensured that the possible stop position has a minimum degree of safety or meets a minimum safety criterion, for example a minimum range of visibility. In this way, the danger to the vehicle can be advantageously limited.

Compared to the existing art, in this regard it is in contrast the case that if the vehicle is to be safely parked, for example if the driver is experiencing a medical emergency, the vehicle is either stopped immediately on the current driving lane or, alternatively, is stopped as far to the right as possible on a multi-lane roadway. This is independent of whether the resulting stop position is safe or not.

According to a specific embodiment, it can be provided that an environmental sensor system of the vehicle uses sensors to acquire a surrounding environment of the vehicle, and the danger measure is ascertained based on the environmental sensor data formed by the environmental sensor system.

That is, in particular, an environmental sensor system of the vehicle is used to ascertain a suitable stop position for the vehicle. An environmental sensor system of the vehicle can in particular include one or more environmental sensors that can in particular have the same construction or can have different constructions. Such sensors can be for example radar sensors, lidar sensors, or ultrasound sensors.

Through the acquisition by sensors of the surrounding environment of the vehicle, it can for example advantageously be ascertained whether a parking lane exists. In particular, it can be ascertained whether an acceleration lane exists. In particular, based on the environmental sensor system it is then possible advantageously to distinguish between the parking lane and the acceleration lane.

As a rule, it is the case that stopping on a parking lane is less dangerous for the vehicle and for other vehicles in comparison with stopping on an acceleration lane. That is, in particular, if it is recognized that the possible stop position is situated on an acceleration lane, the vehicle is not guided to this possible stop position. In particular, the vehicle is then guided to a parking lane, if one is present, in order to then safely park the vehicle there.

In the concrete example named above, the parking lane thus has a lower danger measure than does the acceleration lane.

According to another specific embodiment, it can be provided that the danger measure is ascertained based on map data of a digital map.

Using map data of a digital map, suitable stop positions for the safe parking of the vehicle can advantageously be ascertained particularly easily. This is in particular also the case if no environmental sensor system is available. In particular, such map data can include position data from emergency stopping bays. In an emergency stopping bay, as a rule the vehicle can be parked more safely than on an acceleration lane or on a parking lane. That is, in particular, if the vehicle is to be safely parked, the vehicle is guided to the emergency stopping bay in order to safely park it there.

According to a further specific embodiment, it can be provided that route data are received that describe a travel route situated ahead of the vehicle, the danger measure being ascertained based on the received route data.

That is, in particular, the travel route situated ahead of the vehicle is taken into account with the aim of determining or finding a possible stop position for the safe parking of the vehicle. Such route data can for example be transmitted from other vehicles. In particular, such route data can be sent to the home vehicle from a central server that is external to the vehicle and in particular is external to other vehicles. Such an external server can for example be part of a cloud-based infrastructure. Such route data can for example be sent by radio stations.

Route data can for example include traffic congestion data, this congestion data characterizing or describing congestion on the travel route ahead of the vehicle. For example, route data can include data about construction sites, this data describing or characterizing construction sites located on the travel route ahead of the vehicle. For example, in this way a length of a construction site can advantageously be described. This information can then advantageously be used to ascertain a danger measure of a possible stop position on the travel route ahead of the vehicle. Thus, it can then advantageously be decided whether this possible stop position is suitable for the safe parking of the vehicle or not.

According to another specific embodiment, it can be provided that the route data include occupation state data corresponding to occupation of an emergency stopping bay located on the travel route.

In this way, information is advantageously provided concerning to what extent the emergency stopping bay is occupied. A completely occupied emergency stopping bay is, as a rule, not suitable for safely parking the vehicle there. However, if this information is provided, the vehicle can then advantageously not be guided to this emergency stopping bay, but rather to another emergency stopping bay or to a different possible stop position that is more suitable, i.e. has a lower danger measure.

Route data can for example include position data of the emergency stopping bays.

Route data can in particular include a length of a tunnel and/or of a bridge.

Information that can be provided by route data can in particular also be included in map data of a digital map. That is, in particular, map data of a digital map can also provide information, for example the length of a tunnel and/or the length of a bridge, that can also be provided by the above-mentioned route data.

According to a further specific embodiment, it can be provided that a range of visibility going out from the possible stop position is determined in at least one direction of a travel direction and a direction opposite the direction of travel of the vehicle, the danger measure being ascertained based on the determined range of visibility. That is, in particular, a range of visibility is determined on the basis of the possible stop position, in the travel direction and/or in the opposite direction of travel of the vehicle.

That is, in particular, in this way a visibility of the possible stop position can advantageously be determined. Thus, it is in particular advantageously determined to what extent the possible stop position is visible, in particular in the direction of travel and/or in the opposite direction of travel of the vehicle. Thus, it is advantageously determined to what extent vehicles following the home vehicle (i.e. in the direction of travel) can see the possible stop position. In particular, in this way it is advantageously determined to what extent vehicles coming towards the home vehicle (i.e. in the opposite direction of travel) can see the possible stop position.

A possible stop position that is better visible than other possible stop positions is, as a rule, advantageously better suited for secure parking. This is because oncoming or following vehicles can, as a rule, in this way timely see the parked vehicle, and can then for example reduce their speed.

To determine the range of visibility, for example a curve radius of a travel route segment before and/or after the possible stop position can be determined. In particular, using map data and/or route data it can be determined whether objects are situated in the surrounding environment of the possible stop position that could possibly cause limitation of a range of visibility. Thus, for example a curve can be clearly seen if no objects, such as tall trees, are situated in the surrounding environment of the curve.

According to a specific embodiment, a plurality of possible stop positions is ascertained. Preferably, map data of a digital map and/or route data and/or environmental sensor data are used to determine, starting from the corresponding position, a range of visibility in at least the direction of travel and the opposite direction of travel of the vehicle. That is, in particular, a visibility is determined in the corresponding positions. It is thus in particular ascertained to what extent the vehicle would still be visible to other traffic participants if it were parked safely at the corresponding position.

Preferably, a respective danger measure for the plurality of possible stop positions is ascertained based on map data of the digital map and/or route data and/or environmental sensor data. This is based in particular on the ascertained ranges of view at the various possible stop positions. These ascertained danger measures are compared to a predetermined danger measure threshold value. Preferably, before the comparison a weighting of the ascertained danger measures can be carried out.

Preferably, it is then provided that the vehicle is guided to that possible stop position, of the plurality of possible stop positions, that has a danger measure that is less than or equal to, in particular exclusively less than, the predetermined danger measure threshold value.

If a plurality of possible stop positions have a danger measure that is less than or equal to the predetermined danger measure threshold value, it can in particular be provided that the nearest possible stop position relative to the momentary vehicle position is used as the stop position for the safe parking. In particular, it can be provided that the possible stop position having the lowest danger measure is used as the stop position.

According to another specific embodiment, it can be provided that, if the ascertained danger measure is less than or equal to the predetermined danger measure threshold value, a warning signal is sent out to warn traffic participants in a surrounding environment of the possible stop position, the warning signal including stop position data corresponding to the possible stop position. That is, in particular those traffic participants situated in a defined surrounding environment of the possible stop position are warned.

Through the warning of further vehicles, the corresponding drivers can advantageously be prepared for possible danger. This also advantageously increases safety for the vehicle and also for other traffic participants. In this way, through the provision of the precise position of the possible stop position, the other traffic participants do not remain uninformed as to where specifically the vehicle will be safely parked. Rather, these other traffic participants can then recognize the precise position and prepare accordingly. In particular, it can be provided that the warning signal is sent immediately to the other traffic participants.

Preferably, in addition or alternatively to the immediate transmission, it can be provided that the warning signal is sent indirectly to the traffic participants. Here, "indirectly" means in particular that first the warning signal, including the stop position data, is sent to a server that is external relative to the vehicles, for example a cloud server. This external server can then in particular advantageously send or communicate the warning signal having the stop position data to the other traffic participants. The warning signal can in particular be sent to radio stations and/or traffic reporting services. These can then likewise in particular advantageously forward the warning signal to other traffic participants.

In a further specific embodiment, it can be provided that if the ascertained danger measure is greater than the predetermined danger measure threshold, a further possible stop position is sought. If a further possible stop position is found, then, analogously to the statements above and in the following, the corresponding danger measure is ascertained for this further possible stop position, is compared to the predetermined threshold value, and, as a function of the result of the comparison, the vehicle is then correspondingly guided to the possible stop position.

According to another specific embodiment, it can be provided that the guiding takes place via beacons and/or buoys embedded in the ground. That is, in particular, beacons and/or buoys can guide the vehicle to the possible stop position, in particular to an emergency stopping bay. This is analogous for example to a navigational light in boating. For example, beacons and/or buoys can send out information relating to the possible stop position to the vehicle. Such information can for example include a location of the possible stop position. Such information can for example include a state of occupancy of an emergency stopping bay.

In the sense of the present invention, buoys are in particular technical devices in and/or on the roadway that store information relating to a vehicle guiding and/or vehicle controlling and/or a surrounding environment of the buoy and/or information relating to possible stop positions, and transmit this information to the vehicle passing the location of this buoy. For this purpose, the vehicle has in particular suitable antennas, or in general receiving systems, for receiving this information. Due to their manner of functioning, buoys can in particular be transponders, and can therefore preferably also be referred to as such.

In the sense of the present invention, a beacon designates in particular a marking for the spatial orientation of traffic participants, in particular of the vehicle.

According to a specific embodiment, information can be integrated into the environment surrounding the roadway, for example in buoys and/or beacons integrated in the roadway, on the basis of which information the vehicle can be controlled or guided to a safe position, i.e. the possible stop position.

According to a specific embodiment, magnets embedded in the ground, in particular in the base of the roadway, can guide the vehicle into a safe position. In this case, the vehicle travels along these magnets, analogous to navigation lights or lighthouses or beacons in order to arrive at the possible stop position.

According to a further specific embodiment, directional and/or speed instructions can be provided in the form of barcodes embedded and/or attached on the ground, in particular the base of the roadway, in particular painted on, and/or transponders embedded in the ground, in order to transmit corresponding information to the vehicle and/or to guide and/or control the vehicle to the possible stop position. Such communication can also be designated car-to-infrastructure (C2X) communication.

The position of these beacons and/or buoys is not limited to the ground; rather, these can also alternatively or additionally be attached and/or situated and/or integrated at a different position or other locations. This is a function in particular of the precise technical realization of the beacons and buoys, i.e. the specific technology used to transmit the information to the vehicle.

Information concerning the best possible controlling and/or guiding of the vehicle for a safe emergency stop can for example be transmitted alternatively or additionally via modulated streetlights, in particular LED streetlights, that is, in particular in general via a roadway illumination. Here, "modulated" means in particular that a brightness and/or a wavelength spectrum of the light radiated by the roadway illumination is modulated, in particular in the frequency (or wavelength) domain and/or in the intensity domain.

These intelligent transponders, for example the beacons and buoys, can in turn, in a further specific embodiment, be connected to the cloud or to the cloud server, i.e. to a cloud infrastructure including the cloud server, i.e. in general to a communication network, in order for example to be activated and/or deactivated as a function of traffic or their information content. For example, it can be provided that the controlling or guiding can include an approach to a further emergency stopping bay if the closest emergency stopping bay is full. The named examples are useful in particular if no communication exists with the cloud or the communication network, for example because the vehicle is in a tunnel.

According to a further specific embodiment, it can be provided that the vehicle speed during the safe parking is selected corresponding to a street type that is present. For example, creeping travel can be provided on country roadways. For example, a minimum recommended speed or target speed can be provided on highways.

In the following, the present invention is explained in more detail on the basis of preferred exemplary embodiments.

DETAILED DESCRIPTION OF THE INVENTION

Figure 1:
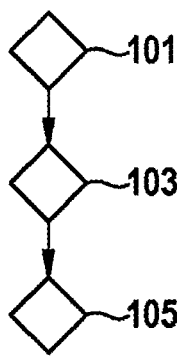
FIG. 1 shows a flow diagram of a method for operating a vehicle.

FIG. 1 shows a flow diagram of a method for operating a vehicle.

According to a step 101, a danger measure is ascertained of a possible stop position for a safe parking of the vehicle. In a step 103, the ascertained danger measure is compared to a predetermined danger measure threshold value. In a step 105, the vehicle is guided to the possible stop position in order to safely park the vehicle in the possible stop position if the ascertained danger measure is less than or equal to, in particular exclusively less than, the predetermined danger measure threshold value.

In a specific embodiment that is not shown, it can be provided that, if the ascertained danger measure is greater than the predetermined danger measure threshold value, a further possible stop position is sought. If a further possible stop position is found, then, analogously to the statements above and in the following, the corresponding danger measure of the further possible stop position is ascertained, is compared to the predetermined threshold value, and the vehicle is then correspondingly guided to the possible stop position as a function of the result of the comparison.

Figure 2:
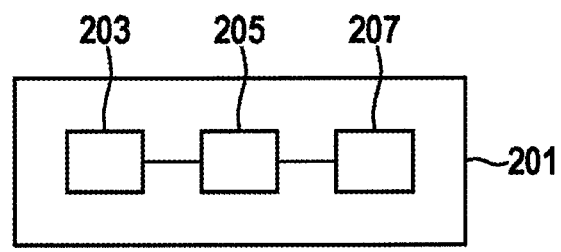
FIG. 2 shows a device for operating a vehicle.

FIG. 2 shows a device 201 for operating a vehicle (not shown).

Device 201 includes an ascertaining device 203 for ascertaining a danger measure of a possible stop position for a safe parking of the vehicle. In addition, device 201 includes a comparator device 205 for comparing the ascertained danger measure to a predetermined danger measure threshold value. In addition, device 201 has a guide device 207 for guiding the vehicle to the possible stop position in order to safely park the vehicle in the possible stop position if the ascertained danger measure is less than or equal to, in particular exclusively less than, the predetermined danger measure threshold value.

In order to guide the vehicle, it can be provided that guide device 207 is connected to actuator systems and/or positioning systems of the vehicle, so that corresponding control signals can be sent from guide device 207 to the above-named systems.

Figure 3:
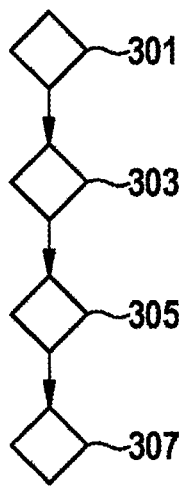
FIG. 3 shows a flow diagram of a further method for operating a vehicle.

FIG. 3 shows a flow diagram of a further method for operating a vehicle.

According to a step 301, environmental sensors of an environmental sensor system of the vehicle are used to ascertain a possible stop position in the measurement range of the environmental sensors. Thus, corresponding environmental sensor data are formed that describe the surrounding environment of the vehicle. In this way, in particular, it can advantageously be ascertained whether a parking lane exists. In particular, in this way it can advantageously be ascertained whether an acceleration lane exists. In particular, in this way a distinction can advantageously be made between the parking lane and the acceleration lane.

Thus, if it has been ascertained in step 301 that a parking lane exists, then in a step 303 map data of a digital map are used to determine, at various locations or positions of the parking lane, a range of visibility going out from the corresponding position in at least the direction of travel and the opposite direction of travel of the vehicle. That is, in particular, a visibility is determined in the corresponding positions of the parking lane. It is thus determined in particular to what extent the vehicle would still be visible to other traffic participants if it were safely parked at the corresponding location.

In a step 305, a respective danger measure is then ascertained for the individual positions based on the ascertained ranges of view at the individual positions or locations. These ascertained danger measures are compared to a predetermined danger measure threshold value.

In a step 307, it is then provided that the vehicle is guided to the location or to the position that has a danger measure that is less than or equal to the predetermined danger measure threshold value.

If a plurality of locations or positions have a danger measure that is less than or equal to the predetermined danger measure threshold value, then it can be provided in particular that the closest location relative to the current vehicle position is used as stop position for the safe parking. In particular, it can be provided that the location having the lowest danger measure is used as stop position.

Thus, the present invention includes in particular the idea of first ascertaining a free and safe stopping position for the safe parking, going out from a current vehicle position. It can be provided in particular that stop positions situated nearby are preferred in this selection. The following procedures can be used here, individually or in combination:

1) The environmental sensors of the vehicle are used in particular to ascertain a suitable position in their measurement range. For this purpose, it can for example be ascertained whether a parking lane exists, and/or this lane can be distinguished from an acceleration lane.
2) Using the street map, i.e. a digital map, the visibility of a stationary vehicle on a curved and hilly street can preferably be determined. Correspondingly, the selection is made in particular at a location at which there is good visibility of the vehicle.
3) A data server, i.e. an external server, can preferably transmit to the vehicle information about emergency stopping bays along a highway, in tunnels, and/or concerning the state of occupancy of these stopping bays. In particular, such stopping bays can transmit their position, for example via radio, directly to vehicles in the vicinity, and thus in particular also to the vehicle seeking to carry out a safe parking.
4) The street map provides in particular information concerning the length of a tunnel and/or of a bridge, for example a length and/or a width.
5) A data server provides in particular information about the length of a construction site.

The realization of the vehicle guidance from the current position to the selected safe and free stop position takes place along a planned trajectory. The following procedures can preferably be used here, individually or in combination:

1) The guiding takes place using beacons/buoys embedded in the ground.
2) The vehicle speed is chosen to be as safe as possible in accordance with the present street type: creeping travel on country roads, minimum recommended speed or target speed on highways.

That is, in particular, in general a decision is made as to where the vehicle can most safely be parked. Here, in particular the safety of the home vehicle and also of following traffic is to be taken into account. In particular, following and/or oncoming traffic is warned.

Possible examples of results of the decision as to where the vehicle can most safely be parked can be the following:

Stopping in the home lane

Stopping on parking lanes, for which purpose in some circumstances several lanes will have to be crossed Stopping in an emergency stopping bay Stopping at a parking area After the decision as to the best suitable stopping place, i.e. the possible stop position, the following and/or oncoming traffic is warned via warning signals.

This takes place for example by transmitting the position of the possible stop position from the vehicle to an external server, for example to a map server that, as a rule, provides map data of a digital map and in particular transmits it to vehicles. The map server preferably distributes the information, i.e. in particular the warning, to the following and/or oncoming vehicles, in particular to automated vehicles, so that these vehicles can correspondingly drive more carefully at the corresponding location or stop position.

For following and/or oncoming traffic, which for example can be made up of non-automated vehicles, a danger message, in particular a warning signal, can preferably be forwarded automatically from the vehicle and/or from the map server to radio stations and/or traffic reporting services. Preferably, a direct warning to the following and/or oncoming traffic is also enabled via Car2Car communication, i.e. communication between a vehicle and another vehicle.

What is claimed is:

1. A method for operating a vehicle, comprising:
    ascertaining a possible stop position;
    determining, via map data of a digital map, ranges of view going out from the possible stop position to individual positions or locations in at least a direction of travel and an opposite direction of travel of the vehicle;
    ascertaining a danger measure of the possible stop position for a safe parking of the vehicle based on the ascertained ranges of view at the individual positions or locations;
    comparing the ascertained danger measure to a predetermined danger measure threshold value;
    guiding the vehicle to the possible stop position to safely park the vehicle in the possible stop position only if the ascertained danger measure is not greater than the predetermined danger measure threshold value.

2. The method as recited in claim 1, further comprising:
    acquiring, by an environmental sensor system of the vehicle, environmental data regarding a surrounding environment of the vehicle, wherein the danger measure is ascertained based on the environmental data acquired by the environmental sensor system.

3. The method as recited in claim 1, further comprising:
    receiving route data describing a travel route ahead of the vehicle;
    wherein the danger measure is also ascertained based on the received route data.

4. The method as recited in claim 3, wherein the route data includes occupation state data corresponding to an occupation of an emergency stopping bay located on the travel route.

5. The method as recited in claim 1, further comprising:
    transmitting, if the ascertained danger measure is not greater than the predetermined danger measure threshold value, a warning signal in order to warn traffic participants in a surrounding environment of the possible stop position, wherein the warning signal includes stop position data corresponding to the possible stop position.

6. The method as recited in claim 1, wherein the possible stop position is ascertained via environmental sensors of an environmental system of the vehicle, and wherein the possible stop position is in a measurement range of the environmental sensors.

7. A driver assistance system for providing an automated control of a vehicle, comprising:
    a driver assistance arrangement configured to perform the following:
        ascertaining a possible stop position;
        determining, via map data of a digital map, ranges of view going out from the possible stop position to individual positions or locations in at least a direction of travel and an opposite direction of travel of the vehicle;
        ascertaining a danger measure of the possible stop position for a safe parking of the vehicle;
        comparing the ascertained danger measure to a predetermined danger measure threshold value; and
        guiding the vehicle to the possible stop position to safely park the vehicle in the possible stop position only if the ascertained danger measure is not greater than the predetermined danger measure threshold value.

8. The driver assistance system as recited in claim 7, wherein the possible stop position is ascertained via environmental sensors of an environmental system of the vehicle, and wherein the possible stop position is in a measurement range of the environmental sensors.

9. A non-transitory, computer-readable data storage medium storing a computer program including program code, which is executable on a computer, comprising:
    a program code arrangement having program code for operating a vehicle, by performing the following:
        ascertaining a possible stop position;
        determining, via map data of a digital map, ranges of view going out from the possible stop position to individual positions or locations in at least a direction of travel and an opposite direction of travel of the vehicle;
        ascertaining a danger measure of the possible stop position for a safe parking of the vehicle;
        comparing the ascertained danger measure to a predetermined danger measure threshold value; and
        guiding the vehicle to the possible stop position to safely park the vehicle in the possible stop position only if the ascertained danger measure is not greater than the predetermined danger measure threshold value.

10. The non-transitory, computer-readable data storage medium of claim 9, wherein the possible stop position is ascertained via environmental sensors of an environmental system of the vehicle, and wherein the possible stop position is in a measurement range of the environmental sensors.

* * * * *